United States Patent Office 3,825,530
Patented July 23, 1974

3,825,530
PROCESS FOR PREPARING α-AMINO-CYCLO-HEXADIENYLALKYLENE PENICILLINS
Manmohan S. Atwal, Somerset, and Eugene R. Shipkowski, Freehold, N.J., assignors to E. R. Squibb & Sons Inc., Princeton, N.J.
No Drawing. Continuation-in-part of abandoned application Ser. No. 23,505, Mar. 27, 1970. This application Nov. 18, 1971, Ser. No. 200,147
Int. Cl. C07d 99/16
U.S. Cl. 260—239.1         7 Claims

ABSTRACT OF THE DISCLOSURE

The present invention is directed to a method for preparing α-amino-cyclohexadienylalkylene penicillin compounds of the formula

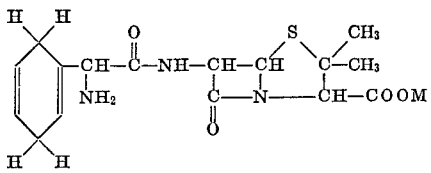

wherein M is an alkali metal, an ammonium ion, or a substituted ammonium ion.

These compounds may be prepared by reacting α-amino-cyclohexadienylmethylene penicillin, hereafter referred to as epicillin, with an alkali metal alkanoate or ammonium alkanoate, or by reacting epicillin with an alkali metal hydroxide or ammonium hydroxide, or by reacting epicillin with an alkali metal alkoxide or ammonium alkoxide, or by reacting epicillin with an amine salt. The reaction to form the alkali metal salt takes place in the presence of sufficient water to form the monohydrate of epicillin without substantially exceeding this amount of water.

RELATED APPLICATION

This application is a continuation-in-part of our copending application, Ser. No. 23,505, filed Mar. 27, 1970, now abandoned.

OBJECTS OF THE INVENTION

It is an object of the present invention to provide more soluble forms of epicillin. A further object is to provide epicillin in a form suitable for oral or parenteral administration. Still another object is to provide methods for the preparation of these compounds. Yet another object is to provide new intermediates for preparing these more soluble forms of epicillin. These and other objects of the present invention will be apparent from the following description.

DETAILED DESCRIPTION

In the compounds of the present invention, M may be Li, Na, K, Rb, Cs, $NH_4$, $NH_3R$, $NH_2R_2$ or $NHR_3$ wherein R may be hydrogen, an alkyl, cycloalkyl, or cycloalkenyl radical, each of up to 8 carbon atoms, or an aryl or arylalkyl radical, each of up to 12 carbon atoms, Two of the R radicals, taken together, may be a heterocyclic radical of up to 8 atoms in the ring.

The alkyl radical may be straight chain or branched. Examples of such alkyl radicals are methyl, ethyl, n-propyl, i-propyl, n-butyl, i-butyl, n-pentyl, 2-methyl-n-butyl, neopentyl, n-hexyl, 2-methyl-n-pentyl, 3-methyl-n-pentyl, 2,2-dimethyl-n-butyl, 2,3-dimethyl-n-butyl, n-heptyl, 2-methyl-n-hexyl, 3-methyl-n-hexyl, 2,2-dimethyl-n-pentyl, 2,3-dimethyl-n-pentyl, 2,4-dimethyl-n-pentyl, 3,3-dimethyl-n-pentyl, 3-ethyl-n-pentyl, 2,2,3-trimethylbutane, n-octyl, 2-methyl-n-heptyl, 3-methyl-n-heptyl, 4-methyl-n-heptyl, 2,3-dimethyl-n-hexyl, 2,4-dimethyl-n-hexyl, 2,5-dimethyl - n - hexyl, 2,2 - dimethyl-n-hexyl, 3,3 - dimethyl-n-hexyl, 2ethyl-n-hexyl, 3-ethyl-n-hexyl, 2,2,3-trimethyl-n-pentyl, 2,2,4-trimethyl-n-pentyl, 2,3,3-trimethyl-n-pentyl, 2,3,4 - trimethyl-n-pentyl, 2 - ethyl - 3 - methyl-n-pentyl, 2-methyl-3-ethyl-n-pentyl, and 2,2,3,3-tetramethyl-n-butyl.

Examples of cycloalkyl radicals are, for example, cyclopropyl, cyclobutyl, cyclopentyl, methylcyclopentyl, dimethylcyclopentyl, trimethylcyclopentyl, cyclohexyl, methylcyclohexyl, dimethylcyclohexyl, cycloheptyl, methylcycloheptyl and cyclooctyl.

The cycloalkenyl radical has a carbon chain corresponding to that of the foregoing cycloalkyl radicals but is monounsaturated. Specific examples of such radicals are monounsaturated derivatives of any of the foregoing cycloalkyl radicals.

The aryl radical may be phenyl or substituted phenyl. Examples of the latter are tolyl, xylyl, cumyl, p-diphenyl and naphthyl.

Examples of arylalkyl radicals are benzyl, phenethyl, n-propylphenyl, i-propylphenyl, α-methylnaphthalene, β-methylnaphthalene, α-ethylnaphthalene, and β-ethylnaphthalene.

The heterocyclic radical may contain a second hetero atom in addition to nitrogen. This second hetero atom may be oxygen, sulfur, or nitrogen. Examples of suitable heterocyclic radicals are pyrrolo, succinimido, 1,3-dimethylpyrrolo, 2,5-dimethylpyrrolo, pyrrolino, pyrrolidino, 2-pyrrolecarboxylic acid, pyrazole, imidazolo, thiazolidino, pyridino, piperidino, and morpholino.

A general reaction for preparing the compounds of the present invention is to replace the carboxylic hydrogen atom with a cation:

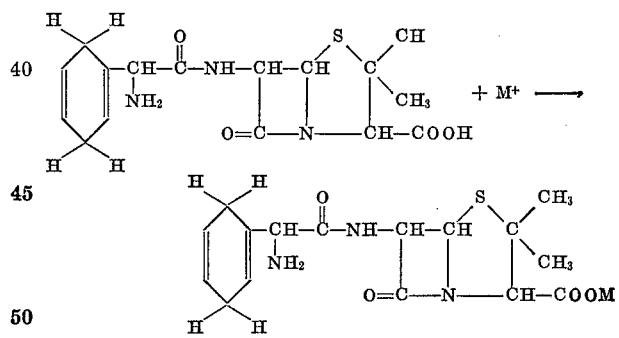

Where M is an alkali metal or $NH_4$, the compounds of the present invention may be prepared by reacting an aqueous slurry of epicillin with the desired alakli metal hydroxide or with ammonium hydroxide according to the following reactions wherein for ease of representation Y represents the residue of the epicillin moiety:

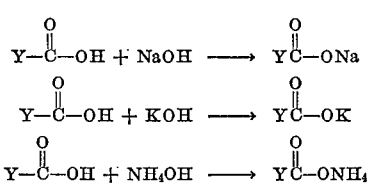

An alternative route is to react an amine salt of epicillin with a fatty acid salt according to the following reactions wherein for ease of representation Y represents the residue of the epicillin moiety and Z represents an alkyl group, M is a alkali metal and R is as defined above:

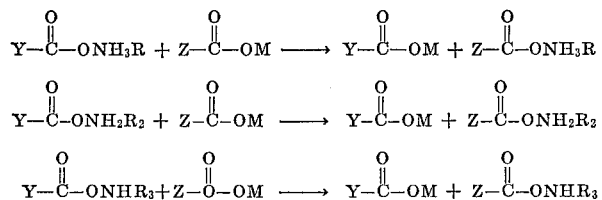

The amine salts of the persent invention wherein M is substittued ammonium may be prepared by reacting a slurry of epicillin in solvent with an alkyl, cycloalkyl, cycloalkenyl, aryl, arylalkyl or heterocyclic amine, wherein the terms alkyl, cycloalkyl, cycloalkenyl, aryl, arylalkyl and heterocyclic are as defined above. The amine salts are useful both as therapeutically useful forms of epicillin and as intermediates in the preparation of alkali metal salts of epicillin.

Examples of suitable alkylamines are methylamine, ethylamine, n-propylamine, i-propylamine, n-butylamine, i-butylamine, t-butylamine, n-amylamine, n-hexylamine, n-octylamine, cyclopropylcarbinylamine, dimethylamine, diethylamine, di-n-propylamine, ethyl-sec-butylamine, ethyl-isopropylamine, trimethylamine, triethylamine, tri-n-propylamine, and methylethylisobutylamine. A plenary listing of suitable alkylamines is obtained by substituting any of the above-mentioned alkyl radicals for one or more of the hydrogen atoms in ammonia.

Examples of suitable cycloalkylamines and cycloalkenylamines are cyclobutylamine, cyclopentylamine cyclohexylamine, cyclobutenylamine, 2-cyclobutenylamine, 3-cyclobutenylamine, 2-cyclohexenylamine, 3-cyclohexenylamine, and 4-cyclohexenylamine.

Examples of suitable arylamines are aniline, N-methylaniline, N-ethylaniline, N,N-dimethylaniline, N,N-diethylaniline, o-toluidine, m-toluidine, p-toluidine, 2,3-xylidine, 2,4-xylidine, 2,5-xylidine, 2,6-xylidine, 3,4-xylidine, 3,5-xylidine, α-naphthylamine, β-naphthylamine, diphenylamine, cumidine, and N-propylaniline.

Examples of arylakylamines are benzylamine, dibenzylamine, phenethylamine, 3-phenyl-n-propylamine, and 1-methylphenethylamine.

Examples of heterocyclic amines are pyrrolidine, piperidine, pyridine, morpholine, and N-methylmorpholine and hexamethylene imine.

Examples of suitable solvents for slurrying the epicillin in order to prepare an amine salt of epicillin are halogenated alkanes, for instance, methylene chloride, ethylene chloride, chloroform, carbon tetrachloride, or mixtures thereof; alcohols, for instance, methanol, ethanol, n-propanol, i-propanol, t-butanol, or mixtures thereof; alkyl cyanides, e.g., acetonitrile, ethylnitrile, n-propylnitrile, isopropylnitrile, butylnitrile, and capronitrile; ethers, e.g. furan, 2,5-dimethylfuran, tetrahydrofuran; ethyl ether, dioxane, 1,1-dimethoxy ethane, and 1,2-dimethoxy ethane; or ketones, e.g. acetone, methyl ethyl ketone, methyl isobutyl ketone and cyclohexanone.

Preferably, in forming the amine salt, enough amine is employed to attain total solution of the epicillin. Generally, less than two moles suffice for this purpose. Preferably, the reaction is conducted at temperatures of about 0° to 5° C. Higher temperatures, while operable, result in lower yield and poorer quality. Preferably, the amine is added slowly to the reaction mixture. A slow rate of addition tends to prevent gelation of the amine salt which takes time to redissolve.

Compounds of the invention wherein M is an alkali metal may also be obtained from the amine salt of epicillin. An alkali metal salt of a fatty acid is dissolved in alcohol and added to the amine salt at temperatures of 0–5° C. The desired salt of epicillin precipitates. Preferably, the acid salt is added slowly to the reaction mixture.

Suitable alcohols for dissolving the fatty acid salt are, for example, methanol, ethanol, n-propanol, i-propanol, t-butanol, and diols, e.g., ethylene glycol, propylene glycol, and mixtures thereof.

The acid salt may be an alkali metal salt of an organic fatty acid of up to 20 carbon atoms. Examples of such acid salts are sodium formate, sodium acetate, sodium n-propionate, sodium butanoate, sodium pentanoate, sodium 3-methyl butanoate, sodium 2,2-dimethyl propanoate, sodium hexanoate, sodium 2-ethylhexanoate, sodium octoate, sodium dodecanoate, sodium tetradecanoate, sodium hexadecanoate, sodium octadecanoate and sodium eicosanoate. Of course, the other alkali metals may be substituted for sodium in any of the foregoing acid salts.

It has been found that the alkali metal salts of epicillin are produced in the form of the monohydrate and that it is necessary for the reaction mixture to contain at least about 2.5 moles of water per mole of epicillin. When lesser amounts of water are present, the salt of epicillin does not form and when amounts of water greater than about 4.5 moles per mole of epicillin are present, the salt of epicillin fails to precipitate. Hence it is critical that the process of the present invention be carried out in the presence of from about 2.5 to about 4.5 moles of water per mole of epicillin.

The alkali metal salts of epicillin monohydrate prepared according to the process of the present invention may be dehydrated to form the corresponding anhydrous epicillin salt. The dehydration may be carried out by azeotropic distillation with water immiscible solvents such as, for example, benzene, toluene, or xylene, or by freeze-drying.

The following examples illustrate the present invention without, however, limiting the same thereto:

EXAMPLE 1

(A) Preparation of diethylamine salt of epicillin

Epicillin (100.0 g. 0.285 mole) is slurried in methylene chloride (2000 ml.) containing 0.2% water and cooled to 0–5° C. while being stirred rapidly. Diethylamine (37.6 g., 0.513 mole) is added dropwise to the cold stirred slurry until total solution is attained. The addition of diethylamine is completed in approximately 30 minutes.

(B) Preparation of sodium 2-ethylhexanoate 2-ethylhexanoic acid (72.0 g., 0.50 mole) is mixed with 400 ml. isopropanol. Sodium hydroxide is added, 0.52 mole (42 g. of a 50% aqueous solution), until a pH of 8.0 is attained. After the addition of NaOH, water in the system is removed by azeotropic distillation until 1.5 N sodium hexanoate solution remains containing 5% water.

(C) Formation of sodium epicillin monohydrate

A 1.5 N solution of sodium 2-ethylhexanoate (210 ml., 0.314 mole equivalent) containing 5% water in isopropyl alcohol (35% solution) from step (B) is added dropwise to the 2000 ml. of clear cold (0–5° C.) amine solution prepared in step (A). The addition is completed in approximately 20 minutes. The reaction mixture is stirred for an additional three hours during which time the temperature is allowed to warm to room temperature (20° C.). The product forms as a precipitate and is filtered using a porous plate glass filter. The filter cake is washed with three 10 ml. portions of diethyl ether and dried under vacuum (20–30 inch Hg) at ambient temperature for 16–18 hours. The white crystalline solid weighs 92.5 g. (82.8 mole percent yield based on epicillin) and is readily soluble in water.

EXAMPLE 2

Preparation of sodium epicillin monohydrate

Epicillin (5.0 g.; 0.014 mole) is stirred in 50 ml. of water. The rapidly stirred suspension is cooled to 5° C. At 5° C., 50% sodium hydroxide solution is added dropwise until total solution of epicillin is observed. The reaction requires 1.43 g. of 50% NaOH (0.018 mole as NaOH). The solution is stirred an additional 30 minutes, after which time the water is removed azeotropically until the water content is reduced to 3 mole equivalents per equivalent of epicillin.

The residual solids are extracted with 500 ml. of warm (40° C.) methyl ethyl ketone. On cooling a white solid precipitates from the solvent. The solid is separated by filtration, washed twice with 10 ml. portions of diethyl ether and dried in a vacuum oven at ambient temperature for 16 hours. A total of 5.17 g. of product is obtained. The material obtained in essentially quantitative yield is soluble in water and melts with decomposition above 225° C.

EXAMPLE 3

To a slurry of epicillin in methanol there are added equimolar quantities of potassium methoxide and 3 equivalents of water. The solution is stirred until reaction is completed, after which the solvent is evaporated. The product obtained is the potassium salt of epicillin monohydrate.

EXAMPLE 4

The procedure of Example 3 is repeated except that the ammonium salt of 2-ethylhexanoate in methylene chloride is used in place of potassium methoxide in methanol. The product obtained is the corresponding ammonium salt of epicillin.

EXAMPLES 5–23

The following amines are reacted with epicillin to form the corresponding amine salt by following the procedure of Example 1(A):

(5) methylamine
(6) ethylamine
(7) dimethylamine
(8) diethylamine
(9) trimethylamine
(10) triethylamine
(11) cyclopropylcarbinylamine
(12) cyclohexylamine
(13) 3-cyclohexenylamine
(14) aniline
(15) N-methylaniline
(16) N,N-diethylaniline
(17) p-toluidine
(18) 3,5-xylidene
(19) cumidine
(20) benzylamine
(21) dibenzylamine
(22) piperidine
(23) morpholine.

EXAMPLES 24–42

Reaction of the epicillin amine salts of Examples 5–23 with sodium-2-ethylhexanoate according to the procedure of Example 1(C) results in the preparation of the sodium salt of epicillin monohydrate.

EXAMPLE 43

The sodium salt of epicillin monohydrate (5.0 g.) is freeze-dried at a temperature of from 0° to −10° C. at a pressure of 0.1 mm. Hg for 78 hours, whereby the monohydrate is converted to the anhydrous sodium salt of epicillin.

EXAMPLE 44

A second sample of the sodium salt of epicillin monohydrate (5.0 g.) is refluxed with benzene until all of the water is removed, whereby the monohydrate is converted to the anhydrous sodium salt of epicillin.

What is claimed is:
1. A method for the production of an alkali metal salt of epicillin which comprises reacting an amine salt of the formula

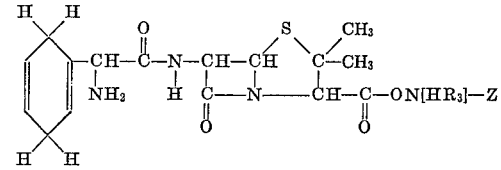

in a non-aqueous solvent with the alkali metal salt of a fatty acid of up to 20 carbon atoms wherein the cation of the fatty acid is the desired alkali metal salt of epicillin, the reaction taking place in the presence of substantially about that amount of water required to form the monohydrate of epicillin, wherein Z is $H_3R$, $H_2R_2$ or $HR_3$ wherein R may be hydrogen, alkyl of from 1 to 8 carbon atoms, monocyclic cycloalkyl of from 3 to 8 carbon atoms or monocyclic cycloalkenyl of from 3 to 8 carbon atoms or phenyl or phenyl substituted by alkyl of 1–3 carbons or by phenyl or phenylalkyl wherein the alkyl group is from 1 to 3 carbon atoms, naphthyl or naphthylalkyl wherein the alkyl group is from 1 to 2 carbon atoms or two R radicals taken together with N may be pyrrolo, succinimido, 1,3-dimethylpyrrolo, 2,5-dimethylpyrrolo, pyrrolino, pyrrolidino, 2-pyrrolcarboxylic acid, pyrazolo, imidazolo, thiazolidino, pyridino, piperdino or morpholino.

2. A method according to Claim 1 wherein the amount of water is from about 2.5 moles to about 4.5 moles per mole of the amine salt of epicillin.

3. A method for the production of an alkali metal or ammonium salt of epicillin which comprises reacting epicillin with an alkali metal or ammonium hydroxide or alkoxide in the presence of substantially about that amount of water required to form the monohydrate of epicillin.

4. A method for the production of the anhydrous alkali metal salt of epicillin which comprises dehydrating a salt of epicillin monohydrate prepared according to Claim 1.

5. A method for the production of the anhydrous alkali metal or ammounium salt of epicillin which comprises dehydrating a salt of epicillin monohydrate prepared according to Claim 3.

6. A method according to Claim 1 wherein R may be alkyl of from 1 to 8 carbon atoms, monocyclic cycloalkyl of from 3 to 8 carbon atoms or monocyclic cycloalkenyl of from 3 to 8 carbon atoms or phenyl, tolyl, xylyl, cumyl, p-diphenyl, benzyl, phenethyl, n-propylphenyl, i-propylphenyl, α-methylnaphthyl, β-methylnaphthyl, α-ethylnaphthyl or β-ethylnaphthyl or two R radicals taken together with N may be pyrrolo, succinimido, 1,3-dimethylpyrrolo, 2,5-dimethylpyrrolo, pyrrolino, pyrrolidino, 2-pyrrolcarboxylic acid, pyrazolo, imidazolo, thiazolidino, pyridino, piperidino or morpholino.

7. A method according to Claim 3 wherein the amount of water is from about 2.5 to about 4.5 moles per mole of epicillin.

References Cited

UNITED STATES PATENTS 3,485,819 12/1969 Weisenburn et al. ___ 260—239.1
3,674,776 7/1972 Long et al. _____ 260—239.1
3,528,965 9/1970 Cole et al. _____ 260—239.1

NICHOLAS S. RIZZO, Primary Examiner

U.S. Cl. X.R.

424—271

PO-1050
(5/69)

UNITED STATES PATENT OFFICE
CERTIFICATE OF CORRECTION

Patent No. 3,825,530      Dated July 23, 1974

Inventor(s) Manmohan S. Atwal et al.

It is certified that error appears in the above-identified patent and that said Letters Patent are hereby corrected as shown below:

Column 2, line 5, "2ethyl" should read --2-ethyl--.

Column 3, line 10, "$\overset{O}{\underset{\|}{-O-}}$" should read -- $\overset{O}{\underset{\|}{-C-}}$ --.

Column 6, claim 1, in the formula "-ON[HR$_3$]-Z" should read -- -ON-Z--.

Signed and sealed this 8th day of October 1974.

(SEAL)
Attest: .

McCOY M. GIBSON JR.
Attesting Officer

C. MARSHALL DANN
Commissioner of Patents